US005737591A

United States Patent [19]
Kaplan et al.

[11] Patent Number: 5,737,591
[45] Date of Patent: Apr. 7, 1998

[54] DATABASE VIEW GENERATION SYSTEM

[75] Inventors: David L. Kaplan, Mercer Island; Andrew R. Miller; Andrew McRae Warden, both of Bellevue, all of Wash.

[73] Assignee: Microsoft Corporation, Redmond, Wash.

[21] Appl. No.: 653,716

[22] Filed: May 23, 1996

[51] Int. Cl.⁶ .................................................. G06F 17/30
[52] U.S. Cl. .......................... 395/601; 395/602; 395/603
[58] Field of Search ................................. 395/601, 602, 395/603

[56] References Cited

U.S. PATENT DOCUMENTS

| 5,419,942 | 5/1995 | Krawchuk et al. | 395/603 |
| 5,600,831 | 2/1997 | Levy et al. | 395/602 |

OTHER PUBLICATIONS

Garvey et al., "ASDViews (Relational Databases)", Proceedings of the 1988 IEEE Symposium on Security and Privacy, 18–21 Apr. 1988, Oakland California, pp. 85–95, Apr. 1988.

Kegun Zhao et al, "Incremental Specification of Views Across Databases" IMS '91 Proceedings. First International Workshop on Interoperability in Multidatabase Systems, 7–9 Apr. 1991, Kyoto, Japan, pp. 187–190, Apr. 1991.

Abou–Rabia et al, "Towards a Methodology for Developing a Federated Database System", Proceedings ICCI '93. Fifth International Conference on Computing and Information, 27–29 May 1993, Sudbury, Ontario, Canada, pp. 560–564, May 1993.

*Primary Examiner*—Paul R. Lintz
*Attorney, Agent, or Firm*—Duft, Graziano & Forest, P.C.

[57] ABSTRACT

A database view generation system for viewing a result set of data extracted from a database by a query. The database view generation system includes selecting a viewpoint from among at least one field set record source of a database sub-schema and generating a view of the result set in at least one level from a perspective of the viewpoint. Generating a view from a viewpoint includes analyzing the sub-schema for connectedness, identifying the sub-schema type, assigning a level indicator value that is indicative of the hierarchical position of record sources in the sub-schema relative to the viewpoint, and displaying a view of the result set based on the level indicator value assigned to each record source containing data in the result set.

33 Claims, 13 Drawing Sheets

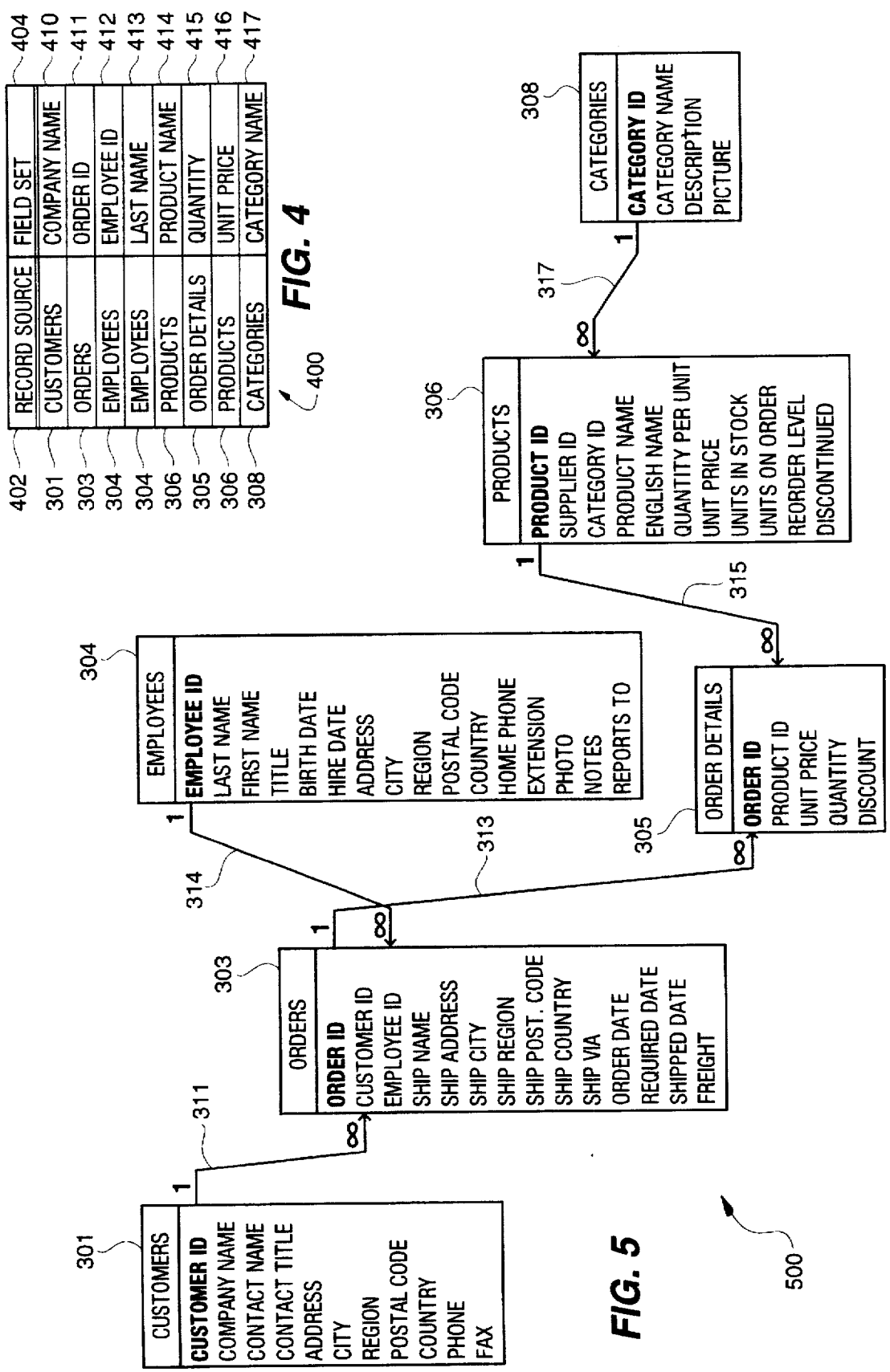

FIG. 13

CUSTOMER ORDERS VIEW

| COMPANY NAME | ORDER ID | EMPLOYEE ID | LAST NAME | PRODUCT NAME | QUANTITY | UNIT PRICE | CATEGORY NAME |
|---|---|---|---|---|---|---|---|
| ALFREDS FUTTERKIST | 10062 | 5 | BUCHANAN | MANJIMUP DRIED APPLES | 12 | $37.10 | PRODUCE |
| | | | | PATE CHINOIS | 20 | $16.80 | MEAT/POULTRY |
| | 10643 | 6 | SUYANA | CHEF ANTON'S GUMBO MIX | 8 | $14.90 | CONDIMENTS |
| | | | | ROSSLE SAUERKRAUT | 15 | $45.60 | PRODUCE |
| | | | | CHARTREUSE VERTE | 21 | $18.00 | BEVERAGES |
| | | | | SPEGESILD | 2 | $12.00 | SEAFOOD |
| | 10692 | 4 | PEACOCK | VEGIE-SPREAD | 20 | $43.90 | CONDIMENTS |
| | 10702 | 4 | PEACOCK | ANISEED SYRUP | 6 | $10.00 | CONDIMENTS |
| | | | | LAKKALIKOOTI | 15 | $18.00 | BEVERAGES |
| | 10835 | 1 | DEVOLIO | ORIGINAL FRANKFURTER | 2 | $13.00 | CONDIMENTS |
| | | | | RACLETTE COURDAVAULT | 15 | $55.00 | DAIRY PRODUCTS |
| | 10952 | 1 | DEVOLIO | GRANDMA'S BOYSENBERRY | 16 | $25.00 | CONDIMENTS |
| | | | | ROSSLE SAUERKRAUT | 2 | $45.60 | PRODUCE |
| | 11011 | 3 | LEVERLING | ESCARGOTS DE BOURGOGNE | 40 | $13.25 | SEAFOOD |
| | | | | FLOTEMYSOST | 20 | $21.50 | DAIRY PRODUCTS |
| ANA TRUJILLO | 10308 | 7 | KING | GUDBRANDSDALSOST | 1 | $28.80 | DAIRY PRODUCTS |
| | | | | OUTBACK LAGER | 5 | $12.00 | BEVERAGES |
| | 10625 | 3 | LEVERLING | TOFU | 3 | $23.25 | PRODUCE |
| | | | | SINGAPOREAN HOKKIEN | 3 | $14.00 | GRAINS/CEREALS |
| | | | | CAMEMBERT PIERROT | 10 | $34.00 | DAIRY PRODUCTS |
| | 10759 | 3 | LEVERLING | MASCARPONE FABIOLI | 10 | $32.00 | DAIRY PRODUCTS |

RECORD: 1 OF 91

FIG. 14

CUSTOMER ORDERS VIEW

COMPANY NAME: ALFRED'S FUTTERKIST — 410
— 411

ORDERS

| ORDER ID | EMPLOYEE ID | LAST NAME |
|---|---|---|
| 10062 | 5 | BUCHANAN |
| 10643 | 6 | SUYAMA |
| 10062 | | PEACOCK |

RECORD 1 OF 6

— 412  — 413

ORDER DETAILS — 414

| PRODUCT NAME | QUANTITY | UNIT PRICE | CATEGORY NAME |
|---|---|---|---|
| MANJIMUP DRIED APPLES | 12 | $37.10 | PRODUCE |
| PATE CHINOIS | 20 | $16.80 | MEAT/POULTRY |
| CHEF ANTON'S GUMBO MIX | 8 | $14.90 | CONDIMENTS |

RECORD 1 OF 3

— 415  — 416  — 417

RECORD OF 3

MARCH 1, 1996  CUSTOMER ORDERS VIEW

| COMPANY NAME | ORDER ID | EMPLOYEE ID | LAST NAME | PRODUCT NAME | QUANTITY | UNIT PRICE | CATEGORY NAME |
|---|---|---|---|---|---|---|---|
| ALFREDS FUTTERKIST | 10062 | 5 | BUCHANAN | MANJIMUP DRIED APPLES | 12 | $37.10 | PRODUCE |
| | | | | PATE CHINOIS | 20 | $16.80 | MEAT/POULTRY |
| | 10643 | 6 | SUYANA | CHEF ANTON'S GUMBO MIX | 8 | $14.90 | CONDIMENTS |
| | | | | ROSSLE SAUERKRAUT | 15 | $45.60 | PRODUCE |
| | | | | CHARTREUSE VERTE | 21 | $18.00 | BEVERAGES |
| | | | | SPEGESILD | 2 | $12.00 | SEAFOOD |
| | 10692 | 4 | PEACOCK | VEGIE-SPREAD | 20 | $43.90 | CONDIMENTS |
| | 10702 | 4 | PEACOCK | ANISEED SYRUP | 6 | $10.00 | CONDIMENTS |
| | | | | LAKKALIKOOTI | 15 | $18.00 | BEVERAGES |
| | 10835 | 1 | DEVOLIO | ORIGINAL FRANKFURTER | 2 | $13.00 | CONDIMENTS |
| | | | | RACLETTE COURDAVAULT | 15 | $55.00 | DAIRY PRODUCTS |
| | 10952 | 1 | DEVOLIO | GRANDMA'S BOYSENBERRY | 16 | $25.00 | CONDIMENTS |
| | | | | ROSSLE SAUERKRAUT | 2 | $45.60 | PRODUCE |
| | 11011 | 3 | LEVERLING | ESCARGOTS DE BOURGOGNE | 40 | $13.25 | SEAFOOD |
| | | | | FLOTEMYSOST | 20 | $21.50 | DAIRY PRODUCTS |
| ANA TRUJILLO | 10308 | 7 | KING | GUDBRANDSDALSOST | 1 | $28.80 | DAIRY PRODUCTS |
| | | | | OUTBACK LAGER | 5 | $12.00 | BEVERAGES |
| | 10625 | 3 | LEVERLING | TOFU | 3 | $23.25 | PRODUCE |
| | | | | SINGAPOREAN HOKKIEN | 3 | $14.00 | GRAINS/CEREALS |
| | | | | CAMEMBERT PIERROT | 10 | $34.00 | DAIRY PRODUCTS |
| | 10759 | 3 | LEVERLING | MASCARPONE FABIOLI | 10 | $32.00 | DAIRY PRODUCTS |

PAGE 1 OF 98

DATABASE VIEW GENERATION SYSTEM

FIELD OF THE INVENTION

This invention relates to the field of database management and in particular to a system for generating a view of a result set from a query where the view is a perspective of the result set based on a predetermined viewpoint.

PROBLEM

A database is a collection of related data typically stored on a non-volatile memory medium. Data in the database are commonly organized in a two-dimensional row and column form called a table. A database typically includes multiple tables. A table is an object in the database that can contain zero or more records and at least one field for each record. A record is a row of data in the table. A field is a subdivision of a record to the extent that a column of data in the table represents the same field for each record in the table. Each field in a record is identified by a unique field name and a field name remains the same for the same field in each record of the table. Therefore, a specific datum in the table is referenced by identifying a record and a field name.

A database management system is a control system that supports database features including, but not limited to, storing data on a memory medium, and retrieving data from the memory medium. Data in the database is typically organized among a plurality of objects that include, but are not limited to, tables, queries, and views. An individual one of the previously identified objects is referred to as a record source because it is a source of data or records from the database. A table is an object having two-dimensional record and field organization as previously discussed. A query, in terms of an object rather than an action, is an executable database interrogation statement, command, and/or instruction that communicates to the database management system the identity and location of data being extracted from the database. The product of an executed query is called a result set and it is the result set that is typically stored and/or manipulated as a two-dimensional object similar to the table discussed previously. A view is a result set in some organized human readable form that is typically a two-dimensional object form.

A relational database is a common database type managed by a database management system. One important characteristic of a relational database is that the data therein is relationally distributed among multiple record sources that are normalized in a manner designed to minimize redundant data in the database, minimize the space required to store data in the database, and maximize data integrity. A normalized database is one where each table in the database is directly related to at least one other table in the same database by key fields. A key can be a primary key or a foreign key. A primary key is the one field or combination of fields in a table that contains unique data for each record in the table. A foreign key is a field or combination of fields in a table that is the basis for a direct relation with any other table's primary key.

A relationship, also referred to as a relation or join, between any two record sources in a relational database is either a direct relationship or an indirect relationship. A direct relationship exists between a first record source and a second record source if there is no intervening record source in the relationship path therebetween. An indirect relationship exists between a first record source and a second record source if there is at least one intervening record source in the relationship path therebetween. The record sources in a relational database and the relations therebetween collectively define the geography of a database called a database schema. A sub-schema of the database is any subset of the full database schema defined by a query, a result set of a query, or any other subset of record sources from the database. A database schema and database sub-schema are typically visually displayed or conceptually thought of in graphic form as a graph having edges or arrows representing relationships between record sources, and vertices, also known as nodes, representing the record sources at either end of a relationship.

A relationship between two record sources in a relational database is said to have cardinality. Cardinality is a representation of the type of direct relation that exists between a primary key and a foreign key in two separate but related record sources. Cardinality can be 1-to-1, 1-to-many, or unknown. For example, in a company database, a 1-to-many relation may exist between a Supplier table having a SupplierID primary key and a Products table having a SupplierID foreign key. A 1-to-many relationship is the most common direct relationship. A many-to-many relationship is an indirect relationship between two record sources that are separated by at least two direct relationships along the relationship path therebetween.

A query is used to access data in a relational database. The query is typically constructed in a Structured Query Language (SQL) that defines the record source, field name, and relationships between record sources for the data being extracted from the database. One problem with viewing the result set containing data extracted by a query is that the relationships that exist among the various record sources from which the data was extracted are no longer apparent to the database user who is viewing the result set. In other words, the result set of a query that is based on multiple tables, typically contains row upon row of records in a "flat" tabular form with data redundancy among the records. The redundant data and lack of clear relationships among the data makes interpreting a flat tabular form result set very difficult to interpret even for the most experienced database user.

Existing database systems facilitate result set viewing by allowing the user to execute a first query to extract a first result set from the database and then execute a second or subsequent query to further examine the result set of the first query. Other database systems provide result set viewing by forcing the user to view large result sets that contain redundant data, or viewing multiple smaller less redundant result sets simultaneously. Each of these solutions fails to provide the database user with a simple view of the entire result set at one time without data redundancy, and thus a difficult to interpret view.

For these reasons, an automatic system is desirable that can generate a well organized view for the database user without data redundancy and with minimal or no user intervention required. A system of this sophistication has heretofore not been realized prior to this disclosure.

SUMMARY

The above identified problems are solved and a technical advance achieved in the field by the database view generation system of the present invention. The database view generation system is a computer operable system for generating a particular data hierarchy, or "view," of the result set of a query. The result set is generated by executing a query that is based on a user selected collection of fields also known as a "field set." The view of a result set is generated from the perspective of a user selected or other predetermined viewpoint.

The database view generation system includes selecting a viewpoint from among the record sources defined by the field set, and generating a view of the result set in at least one level from the perspective of the selected viewpoint. Generating the view includes assigning a level indicator to each of the record sources in a sub-schema that is defined by the field set, and displaying the result set in at least one hierarchical level based on the level indicator assigned to each of the at least one field set record source.

Inputs to the view generation system include a field set that defines the fields of interest to the user, an acyclic graph of the database sub-schema, and a viewpoint for viewing the result set from a perspective. Ideally the sub-schema is a tractable sub-schema. Output from the view generation system is a hierarchical view of the result set from the perspective of the viewpoint. The view generated for a tractable sub-schema includes levels of data that are indicative of the hierarchical relationships in the data when viewing the data from the viewpoint.

Assigning a view level indicator to each of the field set record sources for a non-tractable sub-schema includes assigning a common fixed value level indicator to each of the at least one field set record source in the sub-schema. Assigning a common fixed value level indicator to each of the at least one field set record source produces a flat tabular view of the result set.

Assigning a view level indicator to each of the field set record sources for a tractable sub-schema includes initializing a level indicator to a numeric value, initializing a backbone record source as the viewpoint, assigning the level indicator to the backbone record source and any additional of the at least one field set record source upstream from the backbone record source, incrementing the level indicator, identifying a downstream one of the field set record sources from the backbone record source, reinitializing the backbone record source as the downstream one of the field set record sources. The process is repeated until a downstream record source no longer exists in the sub-schema.

BRIEF DESCRIPTION OF THE DRAWINGS

FIG. 4, illustrates the table form of a field set that is the basis for a query;

FIG. 5 illustrates the graphic form of a database sub-schema based on the FIG. 4 field set;

FIG. 13 illustrates a first view example of a result set from the perspective of a viewpoint;

FIG. 14 illustrates a second view example of a result set from the perspective of a viewpoint; and FIG. 15 illustrates a third view example of a result set from the perspective of a viewpoint.

DETAILED DESCRIPTION

Figure 1:
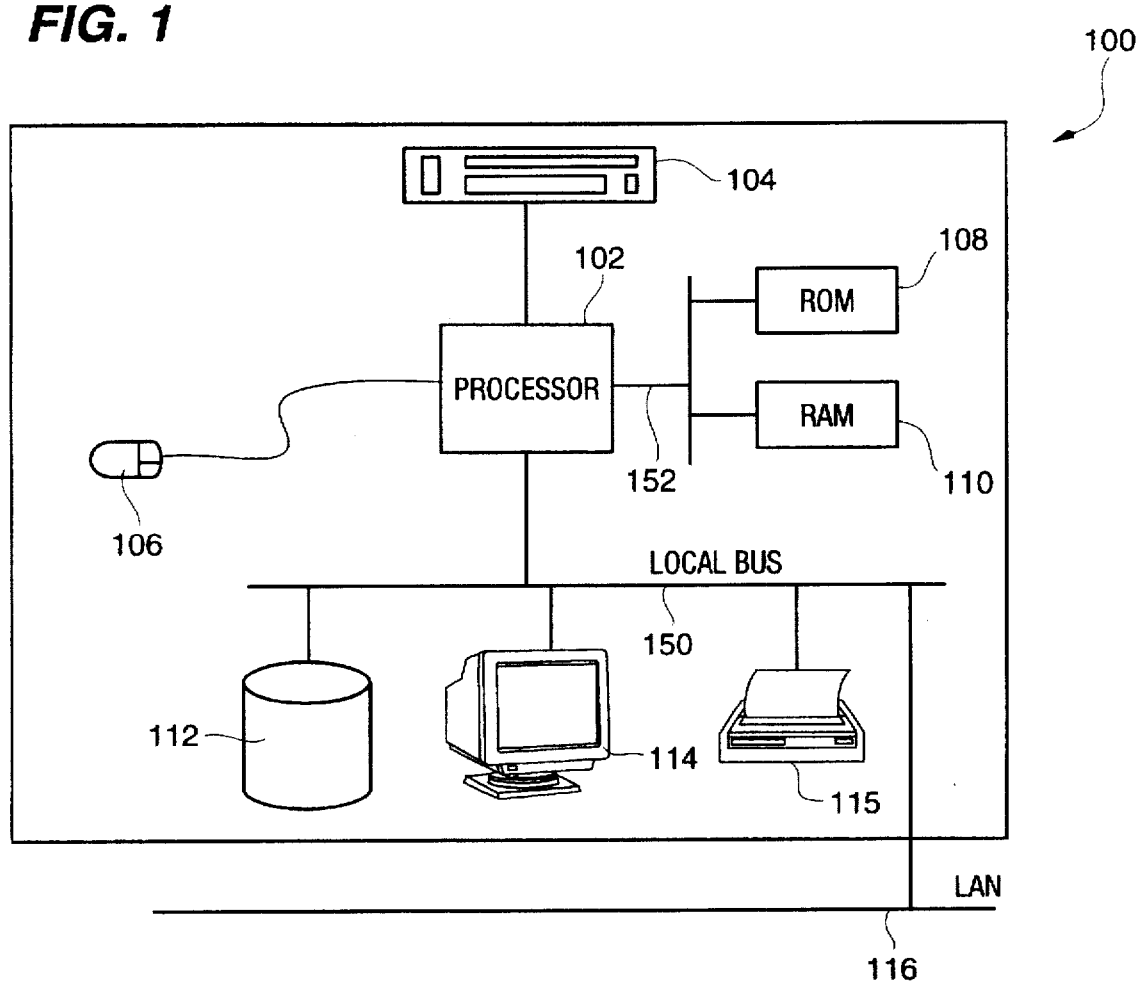
FIG. 1 illustrates a database computing environment in block diagram form.

Database Computing Environment—FIG. 1

FIG. 1 illustrates a block diagram example of a computer system 100 in a database computing environment. The view generation system of the present invention is operable in any of several standard computing systems readily available in the industry. Programmed instructions for the view generation system are executable on processor 102. Processor 102 stores and/or retrieves the programmed instructions and/or data from memory devices that include, but are not limited to, Random Access Memory (RAM) 110 and Read Only Memory (ROM) 108 by way of memory bus 152. Another accessible memory device includes non-volatile memory device 112 by way of local bus 150. User input to computer system 100 is entered by way of keyboard 104 and/or pointing device 106. Human readable output from computer system 100 is viewed on display 114 or in printed "report" form on local printer 115. Alternatively, computer system 100 is accessible for user input and/or generating human readable displays in printed and/or display screen output form by way of Local Area Network (LAN) 116 in a manner well known in distributed computing and computer network art.

Figure 2:
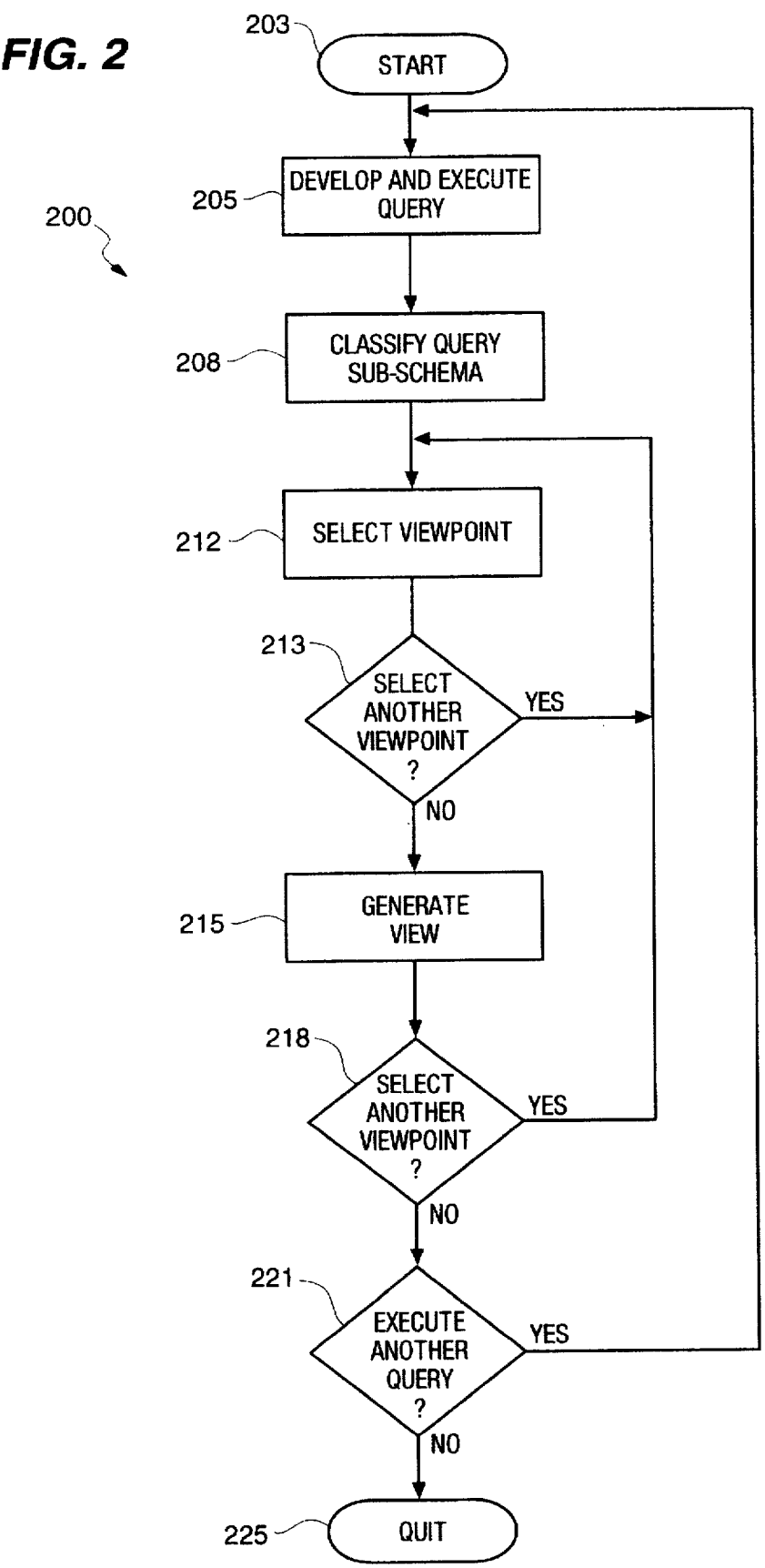
FIG. 2 illustrates overview steps for the database view generation system in flow diagram form.

Database View Generation Overview—FIG. 2

FIG. 2 illustrates an overview of a database management system 200 that includes the database view generation system of the present invention in flow diagram form. The database management system 200 starts at step 203 and in the present illustration assumes that a complete relational database exists in an operable form. A query is developed and executed at step 205 to extract data from the database. The query can be manually developed and executed by a database user, or the query can be automatically generated and executed by a database management system having such an automated feature. In either case, the database view generation system requires input from an executed query that includes a result set, the field set upon which the executed query was based, and an acyclic graph of the sub-schema defined by the field set. An acyclic graph of the sub-schema is generated by generating a graph of all field set record sources and relevant relationships therebetween, and removing any redundant relationship paths between record sources in a manner that leaves only one shortest relationship path between record sources in the graph. Removing the redundant relationship paths is the key to removing cycles from the graph thereby making the graph acyclic. Given the acyclic graph input, the database view generation system classifies the sub-schema based on the sub-schema's connectivity in step 208. Details of sub-schema classification are addressed in FIG. 6 and accompanying text. On advantage of an automated query generating feature of a database management system is that the inputs required by the database view generation system are typically by-products of the query generating process. Thus, it is preferred to use the database view generation system in conjunction with a query generating system.

A viewpoint is selected at step 212. Because the viewpoint selection is not dependent on classifying the sub-schema connectivity, the viewpoint selection in step 212 can occur before, during, or after the sub-schema classification step 208. In a preferred embodiment, viewpoint selection occurs after the sub-schema classification step 208 so that a preview of the levels of a view from the perspective of the viewpoint is immediately presented to the user as discussed in further detail in the text accompanying FIG. 11. If for any reason a user wishes to view the result set of the query from a perspective other than the viewpoint seen in the viewpoint preview at step 212, the database view generation system allows the user an opportunity to select another viewpoint at decision step 213. If no new viewpoint is selected at decision step 213, processing continues at step 215.

Once the sub-schema is classified and the viewpoint selected, a view of the entire result set of data extracted by the query of step 205 is generated in step 215. Details of view generation for a non-tractable sub-schema is discussed in further detail in the text accompanying FIGS. 8–11. Details of view generation for a tractable sub-schema is discussed in further detail in the text accompanying FIGS. 7 and 11–12. In the preferred embodiment, the sub-schema being viewed is a tractable sub-schema. Generic examples of view displays are discussed in further detail in the text accompanying FIGS. 13–15. If for any reason a user wishes to view the result set of a query from a perspective other than the viewpoint presently displayed in the view generated by step 215, the database view generation system allows the user an opportunity to select another viewpoint at decision step 218. One reason a user might elect to view the result set from a new viewpoint is because the present viewpoint is not informative or is not easily understandable. If the user elects not to select a new viewpoint at decision step 218, processing continues at decision step 221 where the user can elect to execute another query by returning to step 205 or quit querying the database at step 225. One reason a user might elect to execute a new query is because the present query failed to extract the desired data regardless of the viewpoint from which the data is viewed.

Figure 3:
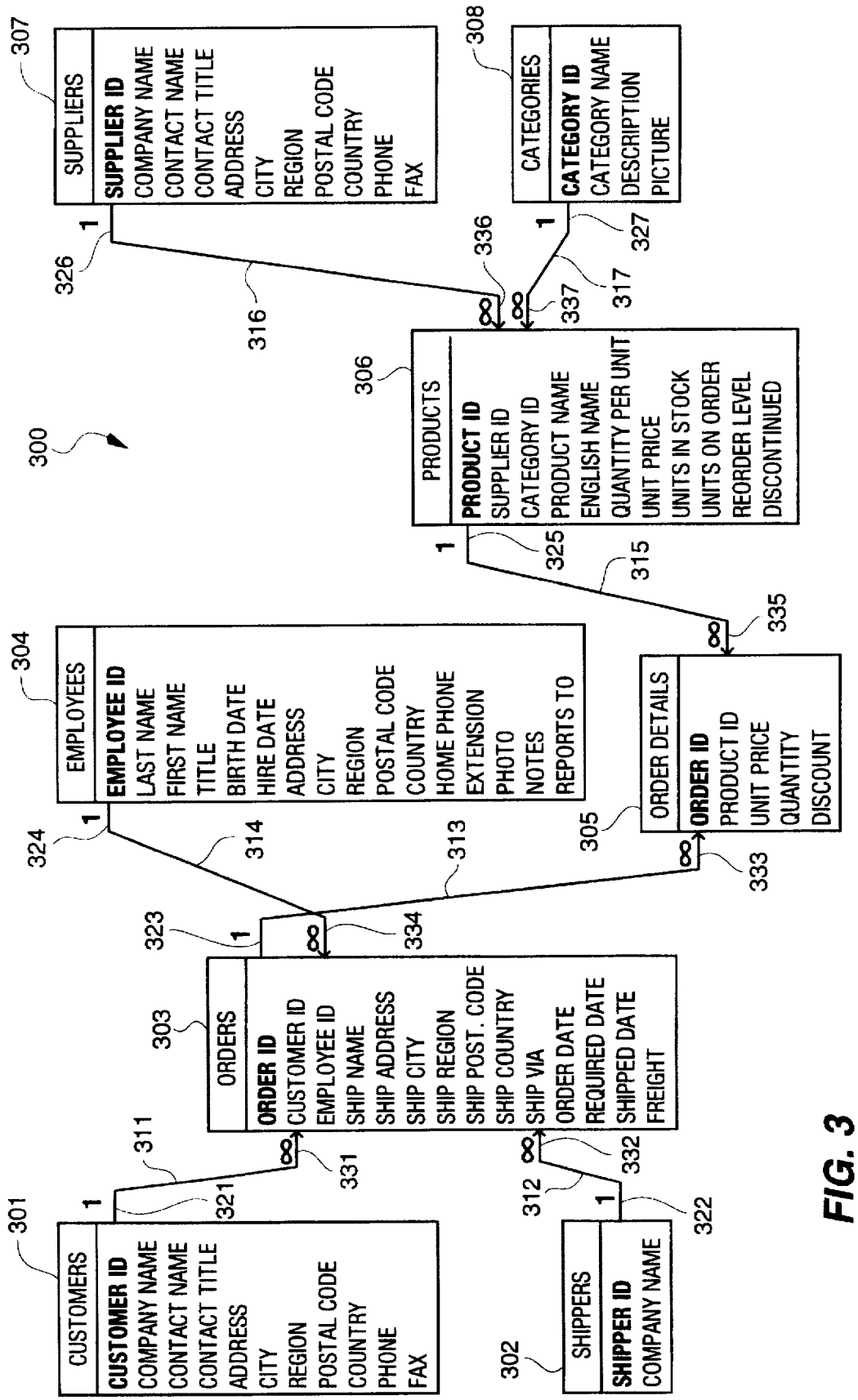
FIG. 3 illustrates a database schema in graphic form.

Database Schema & Sub-schema—FIGS. 3–5

FIG. 3 illustrates a database schema 300 in graphic form. The database schema 300 includes eight record sources 301–308 and seven relationships 311–317 therebetween. Each of the seven relationships 311–317 has an originating end 321–327 respectively and a terminating end 331–337 respectively. The seven relationships 311–317 each have a 1-to-many cardinality. To simplify the illustration the originating ends 321–327 of each relationship are from primary keys of the respective record sources 301–308 and the terminating ends 331–337 point to foreign keys of the respective record sources 301–308.

One important aspect of the database view generation system is that the geography of database schema 300 can be referred to in terms of record sources and relationships, or in terms of graph theory language of vertices, or nodes, and edges. Regardless of the language used to discuss the geography of a database schema, the terms record source, vertex, and node, refer to the same eight objects 301–308 in database schema 300, and the terms relationship, edge, and join, refer to the same seven objects 311–317.

FIG. 4 illustrates the field set list 400 for a field set 404 that is the basis for a query. To illustrate the database view generation system, it is understood for purposes of the present discussion that the user has previously selected field set 404 by way of a user interface. The field set included eight fields 410–417. It is important to note that field set 404 defines the sub-schema 500 in that each of the eight fields 410–417 in fields set 404 originates from one of the eight record sources 301–308 of the database schema 300. Specifically, the field set 404 defines the record source set 402 that includes field set record sources 301, 303–306, and 308.

FIG. 5 illustrates the database sub-schema 500 that is defined by the field set 404 selected by the user. The sub-schema 500 includes six field set record sources 301, 303–306, and 308, and five relationships 311, 313–315, and 317 from the full sub-schema 300. Note that a sub-schema is constructed of record sources and field set record sources, where a field set record source is an ordinary record source that contains a field from the field set. Non-field set record sources can exist in the sub-schema as part of a relationship path from a first field set record source to a second field set record source.

Figure 6:
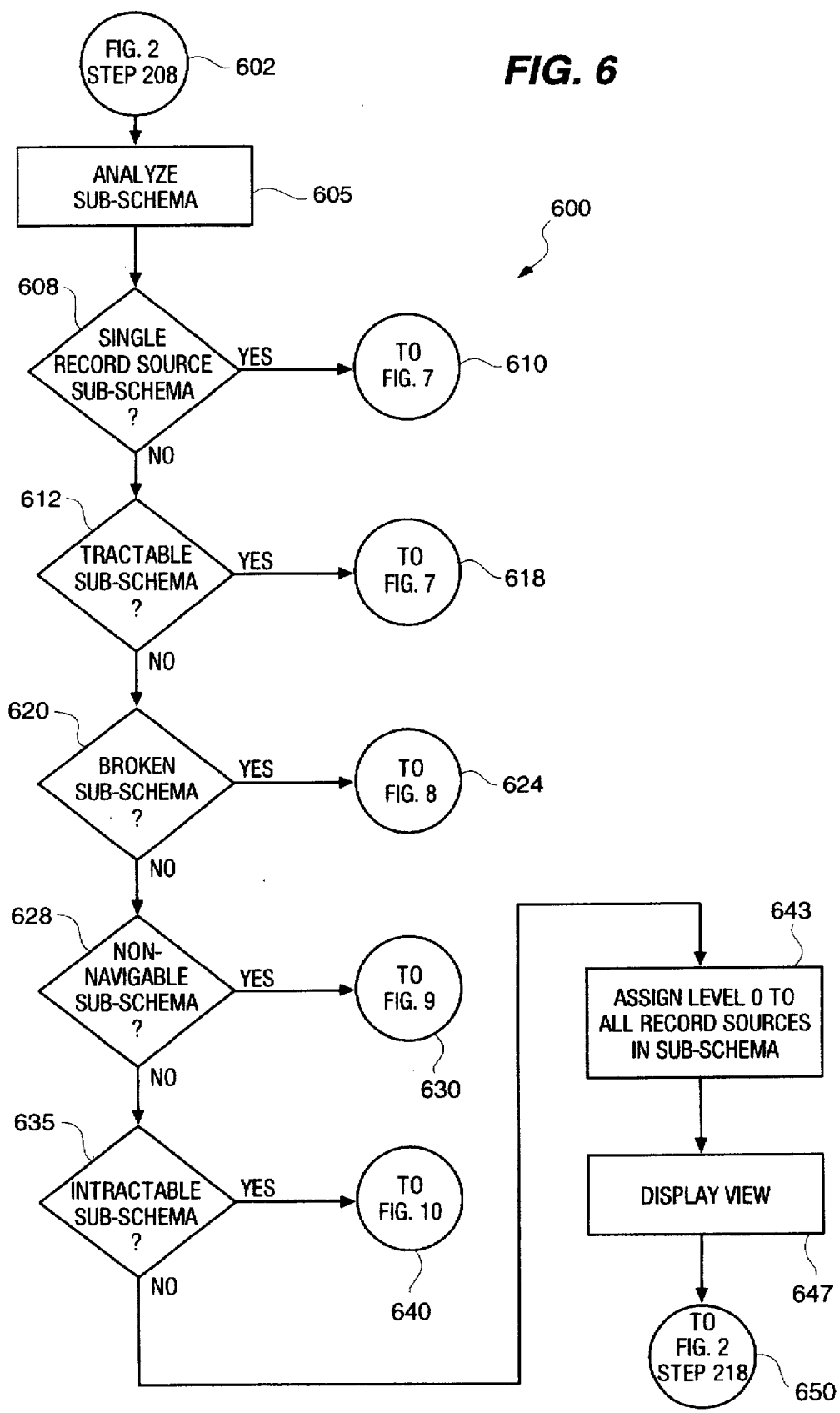
FIG. 6 illustrates database sub-schema classification steps in flow diagram form.

Sub-schema Classification—FIG. 6

FIG. 6 illustrates the sub-schema classification details 600 of step 208 of the database view generation system overview in FIG. 2. The sub-schema classification starts at step 602 where the sub-schema is first analyzed as a graph at step 605. The purpose of the sub-schema analysis is to determine connectivity of the sub-schema. Types of sub-schema connectivity include, but are not limited to, a single node sub-schema, a tractable sub-schema, a broken sub-schema, a non-navigable sub-schema, and an intractable sub-schema. It is important to note that a tractable sub-schema is also navigable, but a navigable sub-schema is not necessarily tractable.

A single node sub-schema is a sub-schema comprised of one record source from which all fields in the field set originate. No relationships exist in this sub-schema because a relationship requires at least two record sources and a single node sub-schema is by definition only one record source without relationships. A single node sub-schema is technically a tractable sub-schema and can be handled in the same manner as a tractable sub-schema, although, the single node sub-schema is highlighted as a special type of sub-schema classification because view generation is greatly simplified once the single node aspect of the sub-schema is known.

A tractable sub-schema is a sub-schema that has only one most-many record source, and all relationships in the sub-schema are of known cardinality. Relationships of known cardinality includes only direct relationships that are of the 1-to-1 or 1-to-many type. A single most-many record source is the last record source along a relationship path or paths that is pointed to directly or indirectly by every other record source in the sub-schema. For example, if the sub-schema is viewed as a hierarchy of record sources at various levels, a single most-many record source is the bottom most record source in a sub-schema that is substantially "V" shaped. In sub-schema 500 the only most-many record source is Order Details 305. A tractable sub-schema is the preferred and most common sub-schema for a relational database and the type of sub-schema that derives the greatest benefit of the database view generation system.

A broken sub-schema is a sub-schema where one part of the sub-schema is disconnected from at least one other part of the sub-schema because there is at least one missing relationship between the portions of the sub-schema.

A non-navigable sub-schema is a sub-schema that contains at least one relationship of unknown cardinality.

An intractable sub-schema is navigable but not tractable. More specifically, there is typically more than one most-many record source in an intractable sub-schema. Therefore, not all relationship paths lead to the same lowest level record source in the sub-schema hierarchy of record sources.

Figure 7:
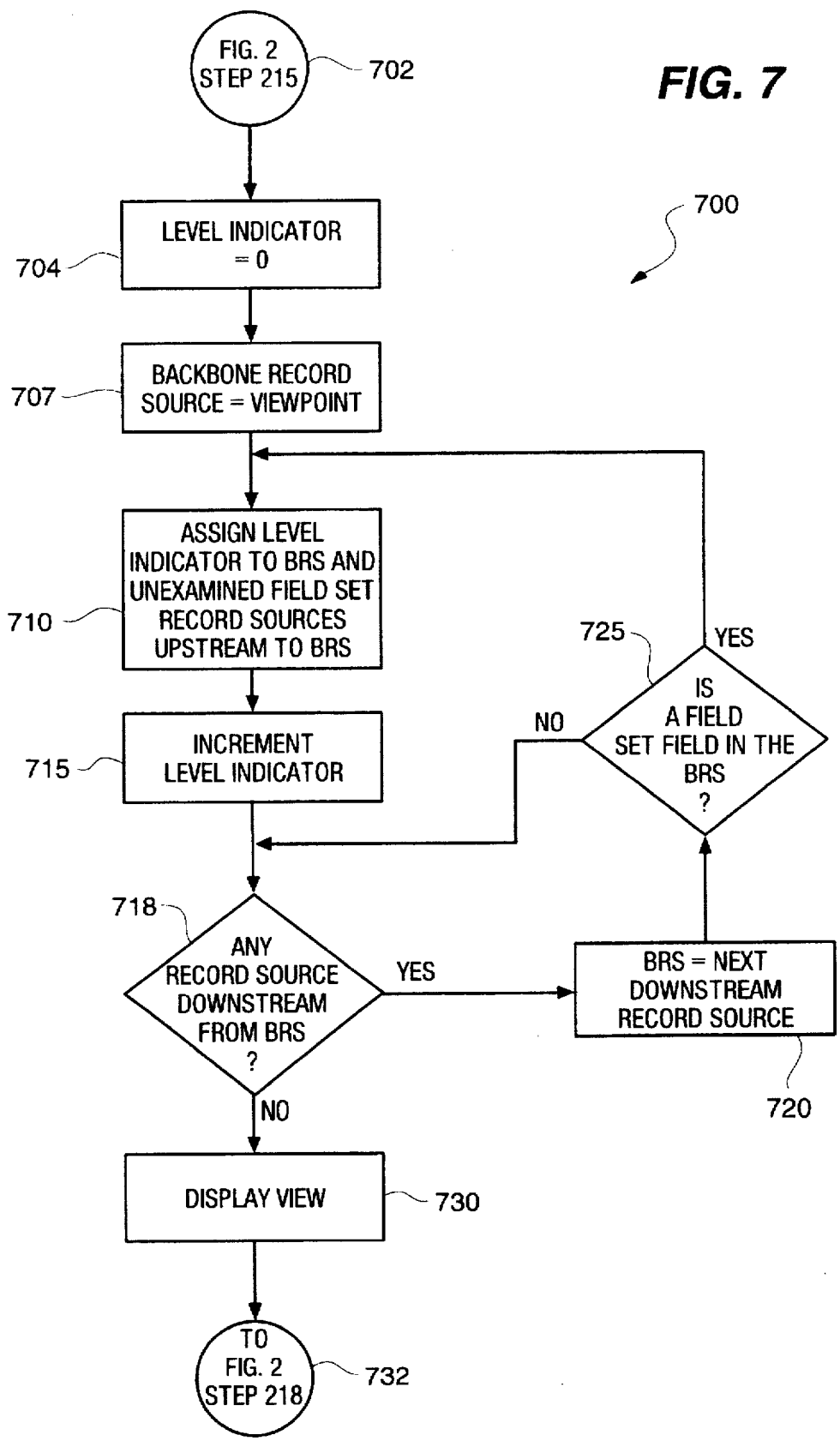
FIG. 7 illustrates tractable sub-schema view generation steps in flow diagram form.

If the result of sub-schema analysis in step 605 is a single record source sub-schema at decision block 608, then view generation proceeds at step 610 in the manner defined in FIG. 7 and its accompanying text.

If the result of sub-schema analysis in step 605 is a tractable sub-schema at decision block 612, then view generation proceeds at step 618 in the manner defined in FIG. 7 and its accompanying text. If the result of sub-schema analysis in step 605 is a broken sub-schema at decision block 620, then view generation proceeds at step 624 in the manner defined in FIG. 8 and its accompanying text. If the result of sub-schema analysis in step 605 is a non-navigable sub-schema at decision block 628, then view generation proceeds at step 630 in the manner defined in FIG. 9 and its accompanying text. If the result of sub-schema analysis in step 605 is an intractable sub-schema at decision block 635, then view generation proceeds at step 640 in the manner defined in FIG. 10 and its accompanying text. If the result of sub-schema analysis in step 605 is any other type sub-schema, every record source in the sub-schema is assigned a level 0 at step 643 and the result set of the sub-schema is displayed in a flat tabular form in step 647. At step 650, processing continues at step 218 in FIG. 2.

Figure 11:
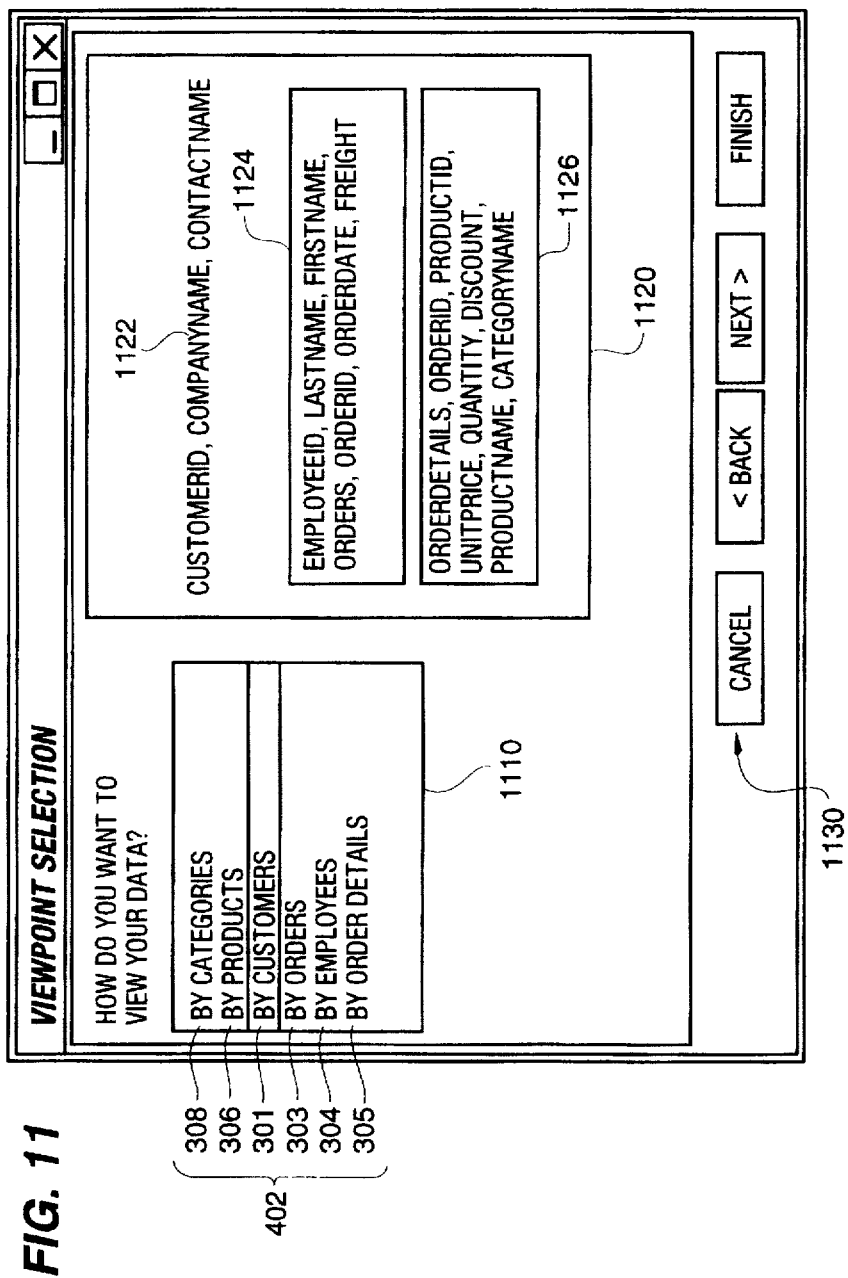
FIG. 11 illustrates an example of a viewpoint selection interface.

Viewpoint Selection—FIG. 11

FIG. 11 illustrates an example of a viewpoint selection interface 1100. The appearance or format of the viewpoint selection interface 1100 is independent of the two primary substantive features of the interface that include a viewpoint menu 1110 and a viewpoint preview 1120. The viewpoint menu 1110 presents the record source set 402 that includes field set record sources 301, 303–3308. The viewpoint preview 1120 presents a preview of the view levels from the viewpoint selected from the viewpoint menu 1110. In the FIG. 11 example, selecting the Customers field set record source 301 produces the viewpoint preview 1120 having three levels 1122, 1124, and 1126. The viewpoint preview 1120 does not contain actual data from a result set. Instead, the viewpoint preview 1120 shows the hierarchy of field names from the field set 404 in the assigned level and order within each level where the actual result set data would occur. However, a viewpoint selection interface can be used to display all or a sample of actual data from a result set. One additional substantive feature of a viewpoint selection interface 1100 is that the user can repeatedly select from among the record source set 402 in the viewpoint menu 1110 to consider each viewpoint preview 1120 until a satisfactory viewpoint is found. The control buttons 1130 allow the user to continue with a selected viewpoint or abandon the selection of any viewpoint from the record source set 402 presented in the viewpoint menu 1110.

Tractable Sub-schema View Generation—FIGS. 7 and 12–15

FIG. 7 illustrates the tractable sub-schema view generation steps 700 in flow diagram form. The tractable sub-schema view generation steps 700 are the details of the view generation step 215 of the database view generation system overview 200 in FIG. 2.

The tractable sub-schema view generation steps 700 begin at step 702 and proceed by initializing a level indicator variable to a predetermined numeric value at step 704, and initializing a backbone record source variable to the user selected viewpoint at step 707. The initializing level indicator value is typically zero in the preferred embodiment to indicate the first or highest level. Any numeric value can be used to represent the first or highest level in the final view provided there is consistency in terms of level identification based on the level indicator. The backbone record source variable is a placeholder for the successive field set record sources that are directly downstream in the sub-schema from the viewpoint selected by the user.

Figure 12:
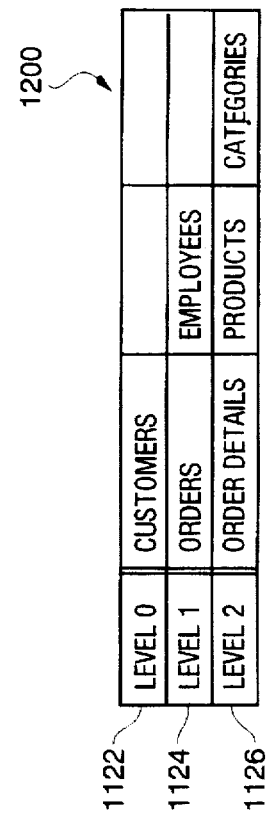
FIG. 12 illustrates a view level table for a sub-schema based on a viewpoint selection.

For illustration purposes, assume that the level indicator is initialized to zero and Customers 301 is the field set record source selected by the user as the viewpoint for a result set extracted by a query that has defined sub-schema 500. FIG. 12 illustrates the view level table 1200 for the view levels 1122, 1124, and 1126 based on the Customers 301 viewpoint.

At step 710 the present level indicator value is assigned to the present backbone record source and any unexamined field set record source in the sub-schema upstream from the present backbone record source. An unexamined field set record source is a field set record source in the sub-schema at issue that has not been assigned a level indicator. An upstream record source N is defined relative to any other record source P, in that N is referred to as being upstream from P if when traversing the sub-schema from N to P, every edge in the path from N to P has a cardinality of either 1-to-1 or 1-to-many along the direction of travel. Therefore, in the present example based on sub-schema 500, the field set record source Customers 301 is assigned a level indicator value of 0 and no other field set record source is included in this level because there are no upstream record sources relative to Customers 301. Therefore, view level table 1200 in FIG. 12 includes only one field set record source Customers 301 at level 0 1122.

The level indicator variable is incremented at step 715 and the sub-schema is examined at decision step 718 to determine if there are any record sources downstream from the present backbone record source. A downstream record source N is defined relative to any other record source P, in that N is referred to as being downstream from P if when traversing the sub-schema from N to P, every edge in the path from N to P has a cardinality of either 1-to-1 or many-to-1 along the direction of travel. If there are no other downstream field set record sources then processing continues to display the view at step 730. If alternatively, there is a downstream field set record source from the present backbone record source, then processing continues at step 720 where the backbone record source variable is reinitialized to represent the next downstream record source. Therefore, in the present example based on sub-schema 500, the record source Orders 303 is downstream from Customers 301 so that the backbone record source variable is reinitialized to represent the record source Orders 303.

The record source represented by the reinitialized backbone record source in step 720, is examined at decision step 725 to determine if the backbone record source variable is a field set record source. That is, if the backbone record source variable does not represent a record source from which a field set 404 field was selected, then processing continues at decision step 718 to identify a further downstream record source or display a view at step 730 as is appropriate for the situation. The reason a non-field set record source is skipped is because a non-field record source contains no data in the result set. Instead, a non-field set record source exists only because it is needed to continue the relationship path between two field set record sources. In the present example, Orders 303 is a field set record source as determined at decision step 725.

Processing will continue at step 710 where the incremented level indicator value of 1 is assigned to the backbone record source Orders 303 and the upstream field set record source Employees 304. The present state of view levels 1122 and 1124 are illustrated in view table 1200 of FIG. 12.

Continuing with the present example, the level indicator variable is incremented at step 715 and the record source Order Details 305 is identified as the next downstream record source relative to the present backbone record source at decision step 718. The present backbone record source is reinitialized to represent the Order Details 305 record source at step 720 and Order Details 305 is verified as a field set record source at decision step 725.

Processing continues at step 710 where the incremented level indicator value of 2 is assigned to the backbone record source Order Details 305 and upstream field set record sources Products 306 and Categories 308. The present state of view levels 1122, 1124, and 1126 are illustrated in view table 1200 of FIG. 12. The level indicator variable is incremented at step 715 an no other record sources are identified as existing downstream from the present backbone record source at decision step 718. Therefore, the resulting view is displayed at step 730 according to view levels 1122, 1124, and 1126 in view table 1200. Tractable sub-schema view generation steps quit at step 732 where processing continues at step 218 as illustrated in FIG. 2.

The FIG. 7 step 730 of displaying a view is the final important step in view generation. Upon reaching step 730, the sub-schema 500 has been analyzed, a viewpoint selected, and a level indicator has been assigned to each field set record source in the sub-schema at issue as illustrated in the view level table 1200 in FIG. 12. With this information, the viewpoint selection interface 1100 is able to present the viewpoint preview 1120 to the database user. The view levels 1122, 1124 and 1126 from the view table 1200 can be displayed in the viewpoint preview 1120 by individual field names within each level. The only step remaining is to present actual data from the result set according to the view levels 1122, 1124, and 1126. In the preferred embodiment this final step is taken at the command of the user who would press the FINISH command from among the command buttons 1130 in FIG. 11. However, the final view can be displayed automatically without user intervention. Alternatively, sample result set data can be displayed as a viewpoint preview.

FIGS. 13–15 illustrate examples of views 1300, 1400, and 1500 respectively based on the same user selected viewpoint. Although a database management system typically provides the user with a choice of a form, report, graph, or custom form or report, the appearance or format of the views is irrelevant provided that the primary feature of view levels is preserved. Therefore, the examples of view 1300, 1400, and 1500 are discussed below as generic views so that the discussion can focus on the substantive advantage of having generated a view with view levels to facilitate interpreting the result set of a query by preserving the hierarchical relationship among the data.

FIG. 13 illustrates an example of a first view 1300 of data in a result set from the perspective of Customers 301 viewpoint. All fields 410–417 in field set 404 are represented by appropriate headings in view 1300. An important advantage of displaying the view based on the view levels 1122, 1124, and 1126 is that redundant data is eliminated from the display thereby making the data easier to interpret. For example, the Company Name field 410 shows a first entry "Alfred Futterkist" only once at view level 1122 for every lower view level 1124 and 1126. Similarly, the Order ID 411, Employee ID 412, and Last Name 413 fields show an entry at view level 1124 only for each new order made by a company at the view level 1122. If a view level 1124 order included more than one product, then only the data in the Product Name 414, Quantity 415, Unit Price 416, and Category Name 417 fields are presented at the lowest view level 1126. The important result is an easy to interpret hierarchically organized view of a result set that is generated automatically by the database view generation system. The first view 1300 can be scrolled up/down and left/right in the present display in a manner well known in the art.

FIG. 14 illustrates an example of a second view 1400 example of a result set from the perspective of Customers 301 viewpoint. All fields 410–417 in field set 404 are represented by appropriate headings in view 1400. An important advantage of the second view 1400 is that data from each view level 1122, 1124, and 1126 is displayed in individually scrolling view windows. Individually scrolling view windows maintains data from higher view levels on the display while successively lower view levels are being scrolled, and eliminates redundant data from the display thereby making the data easier to interpret. For example, the Company Name field 410 shows only one entry from the first view level 1122 at a time for every multi-entry display of the lower view levels 1124 and 1126. Similarly, the Order ID 411, Employee ID 412, and Last Name 413 fields form a second view level 1124 that includes an order entry for each order made by the company of the first view level 1122. If an order displayed in the second view level 1124 includes more than one product, then only the data in the Product Name 414, Quantity 415, Unit Price 416, and Category Name 417 fields are presented in a separate individually scrolling window for the lowest view level 1126. Each of the view levels 1122, 1124, and 1126 includes up/down and left/right scrolling that operates in a manner well known in the art. The important result of generating a view such as the second view 1400 is an easy to interpret hierarchically organized view of a result set that is generated automatically by the database view generation system.

FIG. 15 illustrates an example of a third view 1500 of a result set from the perspective of Customers 301 viewpoint. All fields 410–417 in field set 404 are represented by appropriate headings in view 1500 in a manner similar to the first view 1300. An important advantage of displaying the view based on the view levels 1122, 1124, and 1126 is that redundant data is eliminated from the display thereby making the data easier to interpret. For example, the Company Name field 410 shows a first entry "Alfred Futterkis" only once at view level 1122 for every lower view level 1124 and 1126. Similarly, the Order ID 411, Employee ID 412, and Last Name 413 fields show an entry at view level 1124 only for each new order made by a company at the view level 1122. If a view level 1124 order included more than one product, then only the data in the Product Name 414, Quantity 415, Unit Price 416, and Category Name 417 fields are presented at the lowest view level 1126. The important result is an easy to interpret hierarchically organized view of a result set that is generated automatically by the database view generation system. The third view 1500 can be scrolled up/down and left/right in the present display in a manner well known in the art.

Note that a display as disclosed in any of FIGS. 13–15 includes either a visual display on a display screen or a display as in output on a printed page. In the above discussion, printed output is best suited for the views generated as described in FIGS. 13 and 15.

Figure 8:
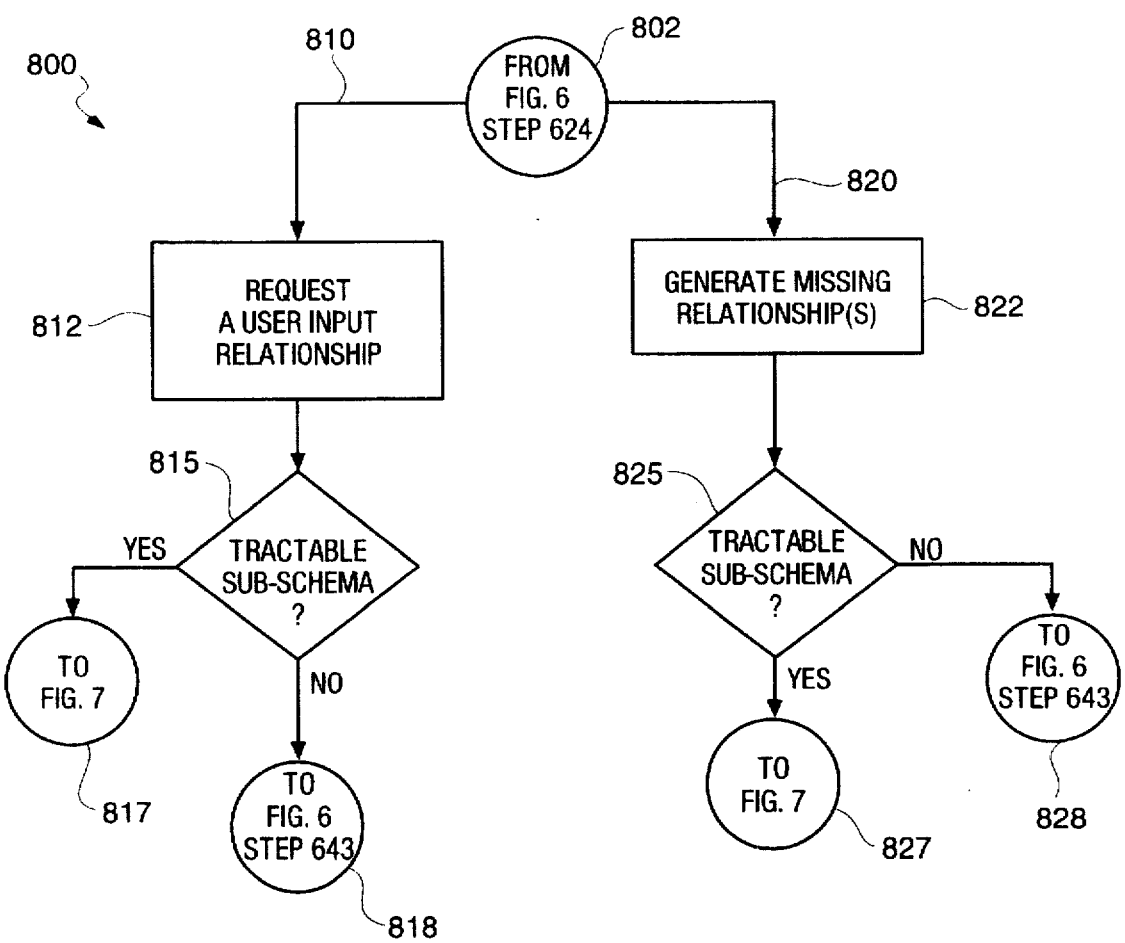
FIG. 8 illustrates broken sub-schema view generation steps in flow diagram form.

Broken Sub-schema View Generation—FIG. 8

FIG. 8 illustrates the broken sub-schema view generation steps 800 in flow diagram form. The broken sub-schema view generation steps 800 are the details of two view generation alternatives 810 and 820 for generating a view for a broken sub-schema identified in FIG. 6 step 620.

The broken sub-schema view generation steps 800 begin at step 802. In one broken sub-schema view generation alternative 810, input is requested from the database user at step 812 to establish at least one relationship necessary to connect any disconnected parts of the sub-schema. Establishing at least one relationship can include, but is not limited to, manually establishing at least one previously unidentified relationship between existing fields in existing record sources, manually establishing at least one new relationship path by adding at least one new record source to the sub-schema, or adding new fields to existing record sources to support at least one new relationship between existing record sources. If the user does not connect the sub-schema, the sub-schema remains broken and no view can be generated. If at least one relationship is established by the database user to connect the sub-schema and the sub-schema is identified as a tractable sub-schema at decision step 815, then processing continues at step 817 to the tractable sub-schema view generation steps 700 previously discussed in FIG. 7. If at least one relationship is established by the database user to connect the sub-schema yet the resulting sub-schema is not tractable, then at step 818 processing returns to FIG. 6 where a level indicator of zero is assigned to each field set record source in the sub-schema at step 643 and a single level flat tabular view of the result set is generated at step 647. An example of a single level flat tabular view can be envisioned as a modified version of the first view 1300 in FIG. 13 where the Customer Name 301 data of level 1122 is repeated for each line of the corresponding lower levels of data 1124 and 1126, and the second level 1124 data is repeated for each line of the corresponding lowest level of data 1126.

In another broken sub-schema view generation alternative 820, the database view generation system itself attempts to generate at least one relationship at step 822 to connect any disconnected parts of the sub-schema. Supplying at least one relationship can include, but is not limited to, establishing at least one previously unidentified relationship between existing fields in existing record sources, establishing at least one new relationship path by adding at least one new record source to the sub-schema, or adding new fields to existing record sources to support at least one new relationship between existing record sources. If at least one relationship is established by the database view generation system and the resulting sub-schema is identified as a tractable sub-schema at decision step 825, then processing continues at step 827 to the tractable sub-schema view generation steps 700 previously discussed in FIG. 7. If at least one new relationship is established so that the resulting sub-schema is not broken yet the resulting sub-schema is not tractable, then at step 828 processing returns to FIG. 6. In FIG. 6 a level indicator of zero is assigned to each field set record source in the sub-schema at step 643 and a single level flat tabular view of the result set is displayed at step 647.

If no attempt is made to connect the broken sub-schema by way of alternative 810 or 820, the database view generation system informs the user that no view can be generated.

Figure 9:
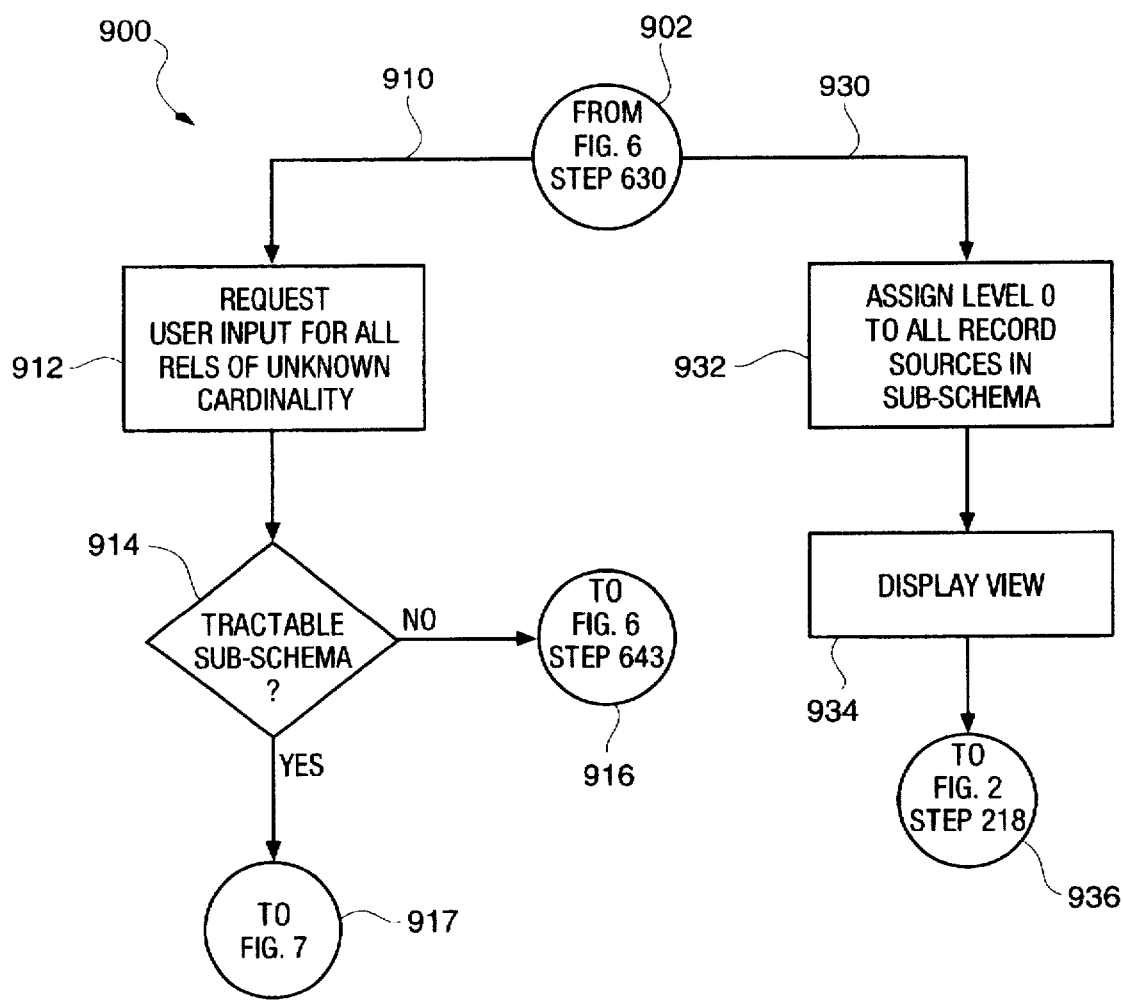
FIG. 9 illustrates non-navigable sub-schema view generation steps in flow diagram form.

Non-Navigable Sub-schema View Generation—FIG. 9

FIG. 9 illustrates the non-navigable sub-schema view generation steps 900 in flow diagram form. The non-navigable sub-schema view generation steps 900 are the details of two view generation alternatives 910 and 930 for generating a view for a non-navigable sub-schema identified in FIG. 6 step 628.

The non-navigable sub-schema view generation steps 900 begin at step 902. In one non-navigable sub-schema view generation alternative 910, input is requested from the database user at step 912 to establish known cardinality of either 1-to-1 or 1-to-many for each relationship of unknown cardinality in the sub-schema. Clarifying a relationship of unknown cardinality can include, but is not limited to, establishing a known cardinality of either 1-to-1 or 1-to-many for the relationship, or adding record source and/or additional relationships that will clarify cardinality for all relationships in the sub-schema. If a relationship of known cardinality is established by the database user and the sub-schema is now identified as a tractable sub-schema at decision step 914, then processing continues at step 917 to the tractable sub-schema view generation steps 700 previously discussed in FIG. 7. If no relationship of known cardinality is established by the database user, or at least one new relationship of known cardinality is established although the resulting sub-schema is not tractable, then at step 916 processing returns to FIG. 6 where a level indicator of zero is assigned to each field set record source in the sub-schema at step 643 and a single level flat tabular view of the result set is displayed at step 647. Thus, with or without a user provided relationship of known cardinality resulting in a navigable sub-schema, a view of the result set is generated for the user.

In another non-navigable sub-schema view generation alternative 930, no attempt is made to clarify the at least one relationship of unknown cardinality. The database view generation system proceeds directly to step 932 where a level indicator of zero is assigned to each field set record source in the sub-schema and a single level flat tabular view of the result set is displayed at step 934. At step 936 processing continues in FIG. 2 step 218.

In another non-navigable sub-schema view generation alternative, the view generation system can automatically resolve the non-navigability of the sub-schema by examining the underlying data of the result set to infer cardinality. Based on the inferred cardinality, a view of the result set is generated and processing continues as previously discussed.

Figure 10:
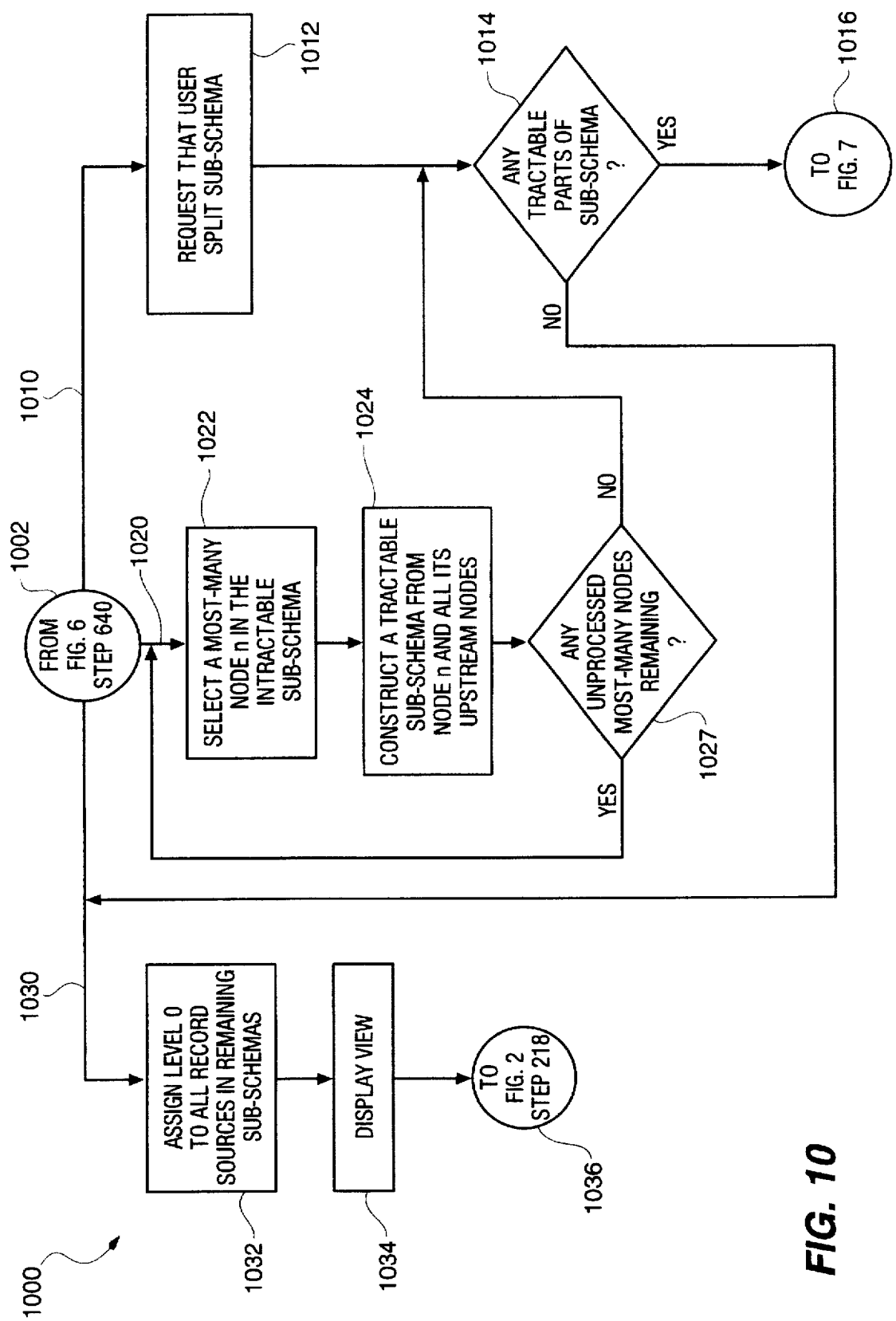
FIG. 10 illustrates intractable sub-schema view generation steps in flow diagram form.

Intractable Sub-schema View Generation—FIG. 10

FIG. 10 illustrates the intractable sub-schema view generation steps 1000 in flow diagram form. The intractable sub-schema view generation steps 1000 are the details of three view generation alternatives 1010, 1020, and 1030 for generating a view for an intractable sub-schema identified in FIG. 6 step 635.

The intractable sub-schema view generation steps 1000 begin at step 1002. In one intractable sub-schema view generation alternative 1010, input is requested from the database user at step 1012 to determine where to split the sub-schema into at least two tractable sub-schema parts. Splitting the sub-schema into at least two tractable sub-schema parts can include, but is not limited to, manually removing at least one existing relationship between existing fields in existing record sources. If any one of the resulting sub-schema parts is identified as a tractable sub-schema at decision step 1014, then processing continues for the at least one sub-schema part at step 1016 to the tractable sub-schema view generation steps 700 previously discussed in FIG. 7. If the sub-schema is not split by the database user, or at least one split was made although some resulting sub-schema part remains intractable at decision step 1014, then processing continues at step 1032 where a level indicator of zero is assigned to each field set record source in the each non-tractable sub-schema part and a single level flat tabular view of the result set for each non-tractable sub-schema part is displayed at step 1034. Thus, whether or not the original intractable sub-schema is split by the database user, a view of the result set is generated for the user.

In another intractable sub-schema view generation alternative 1020, the database view generation system itself determines where to split the sub-schema into at least two guaranteed tractable sub-schema parts. Constructing a guaranteed tractable sub-schema comprises selecting a most-many node N from the sub-schema at step 1022, and constructing a tractable portion of the sub-schema with the most-many node N and all nodes upstream from node N at step 1024. If any additional most-many nodes remain in the sub-schema as determined at decision step 1027, then processing continues at step 1022 as previously described. If no additional most-many nodes remain in the sub-schema as determined at decision step 1027, then processing continues at decision step 1014 where a view of any tractable portions of the sub-schema are generated at step 1016 by the tractable sub-schema view generation steps 700 previously discussed in the text accompanying FIG. 7. Note that based on the above steps, certain of the fields in the result set may appear in more than one of the resulting tractable sub-schema's. A view of any remaining intractable portions of the sub-schema identified at decision step 1014 are generated by way of view generation alternative branch 1030 as disclosed below. Thus, whether or not a tractable sub-schema is generated, a view of the result set is generated for the database user.

In another intractable sub-schema view generation alternative 1030, no attempt is made to resolve the sub-schema intractability. The database view generation system proceeds directly to step 1032 where a level indicator of zero is assigned to each field set record source in the sub-schema and a single level flat tabular view of the result set is displayed at step 1034. At step 1036 processing continues in FIG. 2 step 218.

Summary

The database view generation system of the present invention includes a method and apparatus for selecting a viewpoint from which data in a result set extracted from a database can be viewed, and generating a hierarchical view of the result set from the perspective of the viewpoint. Although specific embodiments are disclosed herein, it is expected that persons skilled in the art can and will design alternative database view generation systems that are within the scope of the following claims either literally or under the Doctrine of Equivalents.

What is claimed is:

1. A computer operable method for generating a view of a result set of data extracted by a query from at least one record source of a database, wherein said query is defined by a field set, and wherein said field set defines a sub-schema of said database comprised of at least one field set record source from among said at least one record source of said database, said method comprising:

selecting a viewpoint from among said at least one field set record source;

classifying said sub-schema based on connectedness of said at least one field set record source in said sub-schema, wherein a connectedness classification is selected from at least one of the group consisting of: tractable and not tractable; and generating a view of said result set in at least one level from a perspective of said viewpoint, wherein said step of generating includes:

assigning a level indicator to each of said at least one field set record source in said sub-schema based on said connectedness classification; and displaying said result set in said at least one level defined by said level indicator assigned to each of said at least one field set record source, wherein a medium for said step of displaying is selected from at least one of the group consisting of: a display screen, and printed output.

2. A method according to claim 1 including:

identifying at least one part of said sub-schema as not tractable; and displaying at least one part of said result set as a single view, wherein said at least one part of said result set corresponds to said at least one part of said sub-schema that is not tractable.

3. A method according to claim 1 including:

identifying at least one part of said sub-schema as tractable;

processing said at least one part of said sub-schema that is tractable in a manner comprising:

(a) initializing said level indicator to a numeric value;
(b) initializing a backbone record source to said viewpoint;
(c) assigning said level indicator to said backbone record source and any additional of said at least one field set record source that is upstream from said backbone record source;
(d) incrementing said level indicator;
(e) identifying a downstream one of said at least one field set record source from said backbone record source;
(f) reinitializing said backbone record source to said downstream one of said at least one field set record source; and
(g) repeating steps (c) through (f) unless said downstream one of said at least one field set record source does not exist; and displaying at least one part of said result set in at least one level based on said level indicator assigned to each of said at least one field set record source, wherein said at least one part of said result set corresponds to said at least one part of said sub-schema that is tractable.

4. A program storage device readable by a computer, tangibly embodying instructions executable by said computer to perform a method for generating a view of a result set of data extracted by a query from at least one record source of a database, wherein said query is defined by a field set, and wherein said field set defines a sub-schema of said database comprised of at least one field set record source from among said at least one record source of said database, said method comprising:

selecting a viewpoint from among said at least one field set record source; and generating said view of said result set in at least one level from a perspective of said viewpoint.

5. A program storage device according to claim 4 wherein said method step of selecting includes:

identifying said viewpoint by way of a user input command.

6. A program storage device according to claim 4 wherein said method step of generating includes:

assigning a level indicator to each of said at least one field set record source in said sub-schema; and displaying said result set in said at least one level based on said level indicator assigned to each of said at least one field set record source, wherein a medium for said step of displaying is selected from at least one of the group consisting of: a display screen, and printed output.

7. A program storage device according to claim 6 wherein said method step of assigning includes:

analyzing said sub-schema for connectedness;

identifying said sub-schema as not tractable; and assigning a common level indicator to each of said at least one field set record source in said sub-schema.

8. A program storage device according to claim 6 wherein said method step of assigning includes:

(a) analyzing said sub-schema for connectedness;

(b) identifying said connectedness of said sub-schema as tractable;

(c) initializing said level indicator to an initial numeric value;

(d) initializing a backbone record source as said viewpoint;

(e) assigning said level indicator to said backbone record source and any additional of said at least one field set record source upstream from said backbone record source;

(f) incrementing said level indicator;

(g) identifying a downstream one of said at least one field set record source from said backbone record source;

(h) reinitializing said backbone record source as said downstream one of said at least one field set record source; and (I) repeating steps (e) through (h) unless said downstream one of said at least one field set record source does not exist.

9. A program storage device readable by a computer, tangibly embodying instructions executable by said computer to perform a computer operable method for generating a view of a result set of data extracted by a query from at least one record source of a database, wherein said query is defined by a field set, and wherein said field set defines a sub-schema of said database comprised of at least one field set record source from among said at least one record source of said database, said method comprising:

selecting a viewpoint from among said at least one field set record source;

classifying said sub-schema based on connectedness of said at least one field set record source in said sub-schema; and generating a view of said result set in at least one level from a perspective of said viewpoint, wherein said step of generating includes:

assigning a level indicator to each of said at least one field set record source in said sub-schema; and displaying said result set in said at least one level defined by said level indicator assigned to each of said at least one field set record source, wherein a medium for said step of displaying is selected from at least one of the group consisting of: a display screen, and printed output.

10. A program storage device according to claim 9 including:

identifying said connectedness of said sub-schema as not tractable and not a single field set record source.

11. A program storage device according to claim 9 including:

identifying said connectedness of said sub-schema as a single field set record source.

12. A program storage device according to claim 9 including:

(a) identifying said connectedness of said sub-schema as tractable;

(b) initializing said level indicator to a numeric value;

(c) initializing a backbone record source to said viewpoint;

(d) assigning said level indicator to said backbone record source and any additional of said at least one field set record source that is upstream from said backbone record source;

(e) incrementing said level indicator;

(f) identifying a downstream one of said at least one field set record source from said backbone record source;

(g) reinitializing said backbone record source to said downstream one of said at least one field set record source; and (h) repeating steps (d) through (g) unless said downstream one of said at least one field set record source does not exist.

13. A program storage device according to claim 9 including:

identifying said connectedness of said sub-schema as broken;

generating at least one relationship to connect said sub-schema;

displaying, in response to successfully generating said at least one relationship, said result set in at least one level as a tractable sub-schema based on said level indicator assigned to each of said at least one field set record source; and displaying, in response to not generating said at least one relationship, said result set as a single level view.

14. A program storage device according to claim 13 wherein said step of generating includes:

requesting said at least one relationship by user input command.

15. A program storage device according to claim 9 including:

identifying said connectedness of said sub-schema as non-navigable;

establishing a known cardinality for each relationship having an unknown cardinality;

displaying, in response to positively establishing said known cardinality for each relationship having said unknown cardinality, said result set in at least one level based on said level indicator assigned to each of said at least one field set record source; and displaying, in response to failing to establish said known cardinality for each relationship having said unknown cardinality, said result set as a single level view.

16. A program storage device according to claim 15 including:

requesting said known cardinality for each said relationship having said unknown cardinality from a user by way of a user input command.

17. A program storage device according to claim 9 including:

identifying said connectedness of said sub-schema as an intractable sub-schema;

generating a sub-schema part of said intractable sub-schema for each most-many node in said intractable sub-schema;

identifying said connectedness of each said sub-schema part;

assigning said level indicator to each said sub-schema part;

displaying, in response to positively identifying a tractable sub-schema part, said result set of said tractable sub-schema part in at least one level based on said level indicator assigned to each of said at least one field set record source; and displaying, in response to identifying a non-tractable sub-schema part, said result set of said non-tractable sub-schema part as a single level view.

18. A program storage device according to claim 17 wherein said step of generating includes:
requesting user input to identify at least one tractable sub-schema part of said sub-schema.

19. A system for generating a view of a result set of data extracted by a query from at least one record source of a database, wherein said query is defined by a field set, and wherein said field set defines a sub-schema of said database comprised of at least one field set record source from among said at least one record source of said database, said system comprising:
means for selecting a viewpoint from among said at least one field set record source; and
means for generating said view of said result set in at least one level from a perspective of said viewpoint.

20. A system according to claim 19 wherein said means for selecting includes:
means for identifying said viewpoint by way of a user input command.

21. A system according to claim 19 wherein said means for generating includes:
means for assigning a level indicator to each of said at least one field set record source in said sub-schema; and
means for displaying said result set in said at least one level based on said level indicator assigned to each of said at least one field set record source, wherein a medium for said step of displaying is selected from at least one of the group consisting of: a display screen, and printed output.

22. A system according to claim 21 wherein said means for assigning includes:
means for analyzing said sub-schema for connectedness;
means for identifying said sub-schema as not tractable; and
means for assigning a common level indicator to each of said at least one field set record source in said sub-schema.

23. A system according to claim 21 wherein said means for assigning includes:
means for analyzing said sub-schema for connectedness;
means for identifying said connectedness of said sub-schema as a tractable sub-schema;
means for initializing said level indicator to a numeric value;
means for initializing a backbone record source as said viewpoint;
means for assigning said level indicator to said backbone record source and any additional of said at least one field set record source upstream from said backbone record source;
means for incrementing said level indicator;
means for identifying a downstream one of said at least one field set record source from said backbone record source; and
means for reinitializing said backbone record source as said downstream one of said at least one field set record source.

24. A computer operable system for generating a view of a result set of data extracted by a query from at least one record source of a database, wherein said query is defined by a field set, and wherein said field set defines a sub-schema of said database comprised of at least one field set record source from among said at least one record source of said database, said system comprising:
means for selecting a viewpoint from among said at least one field set record source;
means for classifying said sub-schema based on connectedness of said at least one field set record source in said sub-schema; and
means for generating a view of said result set in at least one level from a perspective of said viewpoint, wherein said means for generating includes:
means for assigning a level indicator to each of said at least one field set record source in said sub-schema based on a connectedness classification; and
means for displaying said result set in said at least one level defined by said level indicator assigned to each of said at least one field set record source, wherein a medium for said means for displaying is selected from at least one of the group consisting of: a display screen, and printed output.

25. A system according to claim 24 including:
means for identifying said connectedness of said sub-schema as not tractable and not a single field set record source; and
means for displaying said result set as a single level view.

26. A system according to claim 24 including:
means for identifying said connectedness of said sub-schema as a single field set record source; and
means for displaying said result set as a single level view.

27. A system according to claim 24 including:
(a) means for identifying said connectedness of said sub-schema as a tractable sub-schema;
(b) means for initializing said level indicator to a numeric value;
(c) means for initializing a backbone record source to said viewpoint;
(d) means for assigning said level indicator to said backbone record source and any additional of said at least one field set record source that is upstream from said backbone record source;
(e) means for incrementing said level indicator;
(f) means for identifying a downstream one of said at least one field set record source from said backbone record source;
(g) means for reinitializing said backbone record source to said downstream one of said at least one field set record source; and
(h) means for repeating means (d) through (g) unless said downstream one of said at least one field set record source does not exist.

28. A system according to claim 24 including:
means for identifying said connectedness of said sub-schema as a broken sub-schema;
means for generating at least one relationship to connect said broken sub-schema;
means, responsive to said generating means successfully generating said at least one relationship, for displaying said result set in at least one level as a tractable sub-schema based on said level indicator assigned to each of said at least one field set record source; and
means, responsive to said generating means not generating said at least one relationship, for displaying said result set as a single level view.

29. A system according to claim 28 wherein said means for generating includes:

means for requesting said at least one relationship by user input command.

30. A system according to claim 24 including:

means for identifying said connectedness of said sub-schema as a non-navigable sub-schema;

means for establishing a known cardinality for each relationship having an unknown cardinality;

means, responsive to positively establishing said known cardinality for each relationship having said unknown cardinality, for displaying said result set in at least one level based on said level indicator assigned to each of said at least one field set record source; and means, responsive to failing to establish said known cardinality for each relationship having said unknown cardinality, for displaying said result set as a single level view.

31. A system according to claim 30 including:

means for requesting said known cardinality for each said relationship having said unknown cardinality from a user by way of a user input command.

32. A system according to claim 24 including:

means for identifying said connectedness of said sub-schema as an intractable sub-schema;

means for generating a sub-schema part of said intractable sub-schema for each most-many node in said intractable sub-schema;

means for identifying said connectedness of each said sub-schema part;

means for assigning said level indicator to each said sub-schema part;

means, responsive to positively identifying a tractable sub-schema part, for displaying said result set of said tractable sub-schema part in at least one level based on said level indicator assigned to each of said at least one field set record source; and means, responsive to identifying a non-tractable sub-schema part, for displaying said result set of said non-tractable sub-schema part as a single level view.

33. A system according to claim 32 wherein said means for generating includes:

means for requesting user input to identify at least one tractable sub-schema part of said sub-schema.

\* \* \* \* \*